(12) United States Patent
Oishi et al.

(10) Patent No.: US 11,085,843 B2
(45) Date of Patent: Aug. 10, 2021

(54) RELIABILITY DESIGN ASSISTANCE DEVICE, RELIABILITY DESIGN ASSISTANCE METHOD, AND RELIABILITY DESIGN ASSISTANCE PROGRAM

(71) Applicant: TOYOTA JIDOSHA KABUSHIKI KAISHA, Toyota (JP)

(72) Inventors: Kouta Oishi, Nagakute (JP); Kuniyasu Matsumoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 268 days.

(21) Appl. No.: 14/768,937

(22) PCT Filed: Jan. 31, 2014

(86) PCT No.: PCT/JP2014/000537
§ 371 (c)(1),
(2) Date: Aug. 19, 2015

(87) PCT Pub. No.: WO2014/129125
PCT Pub. Date: Aug. 28, 2014

(65) Prior Publication Data
US 2016/0003695 A1    Jan. 7, 2016

(30) Foreign Application Priority Data
Feb. 21, 2013    (JP) .............................. JP2013-031747

(51) Int. Cl.
*G01L 5/22* (2006.01)
*G06Q 10/04* (2012.01)
(Continued)

(52) U.S. Cl.
CPC ............... *G01L 5/22* (2013.01); *G06Q 10/04* (2013.01); *G06F 30/23* (2020.01); *G06F 2111/10* (2020.01)

(58) Field of Classification Search
CPC ....................................................... G01L 5/22
See application file for complete search history.

(56) References Cited

U.S. PATENT DOCUMENTS

2008/0015827 A1* 1/2008 Tryon, III ............. G06F 11/008
703/2

FOREIGN PATENT DOCUMENTS

DE    10 2010 024 683 A1    12/2011
JP         2002-149714 A       5/2002
(Continued)

OTHER PUBLICATIONS

Panagiotis K. Artemiadis and Kostas J. Kyriakopoulos, Estimating Arm Motion and Force using EMG signals: On the Control of Exoskeletons, Nice, France, Sep. 22-26, 2008, 2008 IEEE/RSJ International Conference on Intelligent Robots and Systems Acropolis Convention Center (Year: 2008).*

(Continued)

*Primary Examiner* — Matthew G Marini
(74) *Attorney, Agent, or Firm* — Oblon, McClelland, Maier & Neustadt, L.L.P.

(57) ABSTRACT

A relational expression calculator calculates a relational expression by performing approximation calculation for data strings each of which associates the value of a subject factor, which varies according to a user or an environment, with an input stress measurement value that is measured when a subject device is used. An input stress calculator calculates an input stress, which is input to the subject device, according to the relational expression and to index data on the subject factor. A failure rate calculator calculates a failure rate of the subject device according to the input stress and to a characteristic value distribution of the subject device.

11 Claims, 6 Drawing Sheets

(51) Int. Cl.
*G06F 30/23* (2020.01)
*G06F 111/10* (2020.01)

(56) References Cited

FOREIGN PATENT DOCUMENTS

JP       3816738 B2    8/2006
JP       4613555 B2    1/2011

OTHER PUBLICATIONS

Professor Sir Michael Brady FRS FREng, "Probability", Hilary 2006 (Year: 2006).*

Chamis, C., "Probabilistic Methods for Structural Design and Reliability", 8th SAE Reliability, Maintainability, Supportability & Logistics Conference, Dallas, TX, May 1996 (Year: 1996).*

Federico Parietti and Harry H. Asada, Dynamic Analysis and State Estimation for Wearable Robotic Limbs Subject to Human-Induced Disturbances, 2013 IEEE International Conference on Robotics and Automation (ICRA) Karlsruhe, Germany, May 6-10, 2013 (Year: 2013).*

International Search Report dated Mar. 4, 2014 in PCT/JP2014/000537.

Yasuhiko Tamura, et al., "A Study on the Method to Manage Design Knowledge on Failures: The Acquisition of Knowledge on Failures Based on Stress-Strength Model" Journal of the Japanese Society for Quality Control, vol. 31, No. 1, 2001, pp. 168-180 (with English Abstract).

German Office Action dated Jul. 17, 2020 in German Patant Application No. 112014000935.0 (submitting English translation only), 7 pages.

Frick, H., "Software erleichtert Risikobeurteilung" Aug. 12, 2011. Seiten 1-3. Retrieved from the internet: URL: https://www.computer-automation.de/steuerungsebene/safety-security/software-erleichtertrisikobeurteilung.81260.html [abgerufen am Jul. 7, 2020], 6 pages.

\* cited by examiner

RELIABILITY DESIGN ASSISTANCE DEVICE, RELIABILITY DESIGN ASSISTANCE METHOD, AND RELIABILITY DESIGN ASSISTANCE PROGRAM

TECHNICAL FIELD

The present invention relates to a reliability design assistance device, a reliability design assistance method, and a reliability design assistance program.

BACKGROUND ART

Recently, safety requirements for manufacturers are increased. As safety requirements are increased, it becomes essential to carry out risk assessment at product development time. General risk assessment is performed, for example, according to the following process.

First, "(1) Definition of the use and misuse of a product" is performed. This is a step for identifying a user, who will use the product, and an intended usage scene, where the product is used, to define a predictable misuse. After that, "(2) Estimation of a failure rate and estimation of a generation frequency" is performed. This is composed of a step for estimating an input stress (load) that the use and misuse of the product will give to the parts of the product and for estimating a failure rate (2-1: Estimation of a failure rate), and a step for estimating a risk generation frequency while considering the misuse frequency and the part failure probability (2-2: Estimation of a generation frequency).

In parallel with the step in (2) described above, "(3) Identification of a hazard, estimation of level of a risk that the hazard will give" is performed. This is composed of a step for identifying a hazard that a failure or a behavior, which is caused by the use and misuse of the product, will cause (3-1: Identification of a hazard) and a step for estimating the level of a risk that the hazard will give (3-2: Estimation of the level of a risk).

After that, "(4) Evaluation of a risk" is performed after the steps in (2) and (3) described above. This is a step for evaluating the risk based on the two factors calculated in the above steps; the risk generation frequency and the level of the risk. Of the steps (1) to (4) described above, it is very important to accurately estimate the failure rate in the step for estimating the failure rate (2-1).

Patent Literature 1 discloses a reliability design assistance device that calculates the failure rate of a product, such as a home electric appliance, that is installed indoors for use. This reliability design assistance device defines the reference value of fault generation and calculates the failure rate by comparing the probability density distribution of the characteristic value of parts and the reference value.

In the market of products for use in the outdoor environment, the failure rate is calculated using a stress-strength model. In the method using a stress-strength model, the input stress in the market is defined as a distribution through measurement, and this distribution is compared with the probability density distribution of part characteristic values to calculate the failure rate.

CITATION LIST

Patent Literature

Patent Literature 1: Japanese Patent Application Publication No. 2002-149714 (JP 2002-149714 A)

Non Patent Literature

Non-Patent Literature 1: Tamura Yasuhiko, Iizuka Yoshinori A Study on the Method to Manage Design Knowledge on Failures: The Acquisition of Knowledge on Failures Based on Stress-Strength Model, Journal of the Japanese Society for Quality Control 31(1), P 168-180

SUMMARY OF THE INVENTION

Problem to be Solved by the Invention

However, there is the following problem when the technology described in Patent Literature 1 is used. The reliability design assistance device described in Patent Literature 1 calculates a failure rate by defining the reference value of fault generation. However, when the input stress varies widely, this reliability design assistance device cannot be used because the reference value of fault generation cannot be determined.

In addition, a general stress-strength model such as the one described above uses an input stress distribution as described above. The input stress distribution is determined not only by design factors such as the shape or the configuration of the parts of a product but also by factors such as the user's physical feature and the usage (for example, the road surface condition when the product is used). A general stress-strength model does not consider these factors.

For example, for a product that generates a large energy such as an automobile, the user's weight factor and the usage factor have little or no effect on the input stress. Therefore, when designing a product such as an automobile, the failure rate can be accurately calculated by a stress-strength model.

On the other hand, when factors such as the user's weight or the road surface condition, that is, the factors that vary widely according to the user or the environment, have a high correlation with the input stress distribution, the accuracy of the failure rate derived by a general stress-strength model is low.

That is, in the conventional technology, there is the problem that, when the factors that vary widely according to the user or the environment have a high correlation with the input stress, the product failure rate cannot be calculated accurately.

In view of the foregoing, it is an object of the present invention to provide a reliability design assistance device, a reliability design assistance method, and a program that accurately calculate a product failure rate even when the factors that vary widely according to the user or the environment have a high correlation with the input stress.

Means for Solving the Problem

According to one aspect of the present invention, a reliability design assistance device includes relational expression calculation means that calculates a relational expression by performing approximation calculation for data strings each of which associates a value of a subject factor with an input stress measurement value, the subject factor varying according to a user or an environment, the input stress measurement value being measured when a subject device is used; input stress calculation means that calculates an input stress according to the relational expression and to index data on the subject factor, the input stress being input to the subject device; and failure rate calculation means that calculates a failure rate of the subject device according to the input stress and to a characteristic value distribution of the subject device.

In this aspect, it is desirable that the index data be a probability density distribution of a physical feature of the user, that the input stress calculation means calculate a stress distribution as the input stress based on the relational expression and the probability density distribution, and that the failure rate calculation means calculate the failure rate of the subject device from an overlap between the stress distribution and the characteristic value distribution.

In this aspect, it is desirable that the input stress calculation means calculate a threshold straight line by substituting a worst value of the subject factor in the relational expression and that the failure rate calculation means calculate the failure rate of the subject device from a distribution area formed by the characteristic value distribution and the threshold straight line.

In this aspect, it is desirable that the reliability design assistance device further include input stress distribution adjustment means that adjusts the input stress calculated by the input stress calculation means by performing a finite element analysis using shape data on parts used in the subject device.

In this aspect, the subject factor is the physical feature of the user, a usage environment of the subject device, an actual measurement value when the subject device is used, or a characteristic value of the subject device, and the index data is the probability density distribution of the physical feature of the user when the subject factor is the physical feature of the user, actual measurement data in a form of a plurality of enumerated actual measurement values when the subject factor is an actual measurement value when the subject device is used, and a worst value that can be calculated from a nature of the subject device when the subject factor is the characteristic value of the subject device.

According to one aspect of the present invention, a reliability design assistance method includes a relational expression calculation step of calculating a relational expression by performing approximation calculation for data strings each of which associates a value of a subject factor with an input stress measurement value, the subject factor varying according to a user or an environment, the input stress measurement value being measured when a subject device is used; an input stress calculation step of calculating an input stress according to the relational expression and to index data on the subject factor, the input stress being input to the subject device; and a failure rate calculation step of calculating a failure rate of the subject device according to the input stress and to a characteristic value distribution of the subject device.

According to one aspect of the present invention, a reliability design assistance program causes a computer to perform a relational expression calculation step of calculating a relational expression by performing approximation calculation for data strings each of which associates a value of a subject factor with an input stress measurement value, the subject factor varying according to a user or an environment, the input stress measurement value being measured when a subject device is used; an input stress calculation step of calculating an input stress according to the relational expression and to index data on the subject factor, the input stress being input to the subject device; and a failure rate calculation step of calculating a failure rate of the subject device according to the input stress and to a characteristic value distribution of the subject device.

Effects of the Invention

The present invention provides a reliability design assistance device, a reliability design assistance method, and a program that accurately calculate a product failure rate even when subject factors, which vary widely according to the user or the environment, have a high correlation with the input stress.

MODES FOR CARRYING OUT THE INVENTION

First Embodiment

Figure 1:
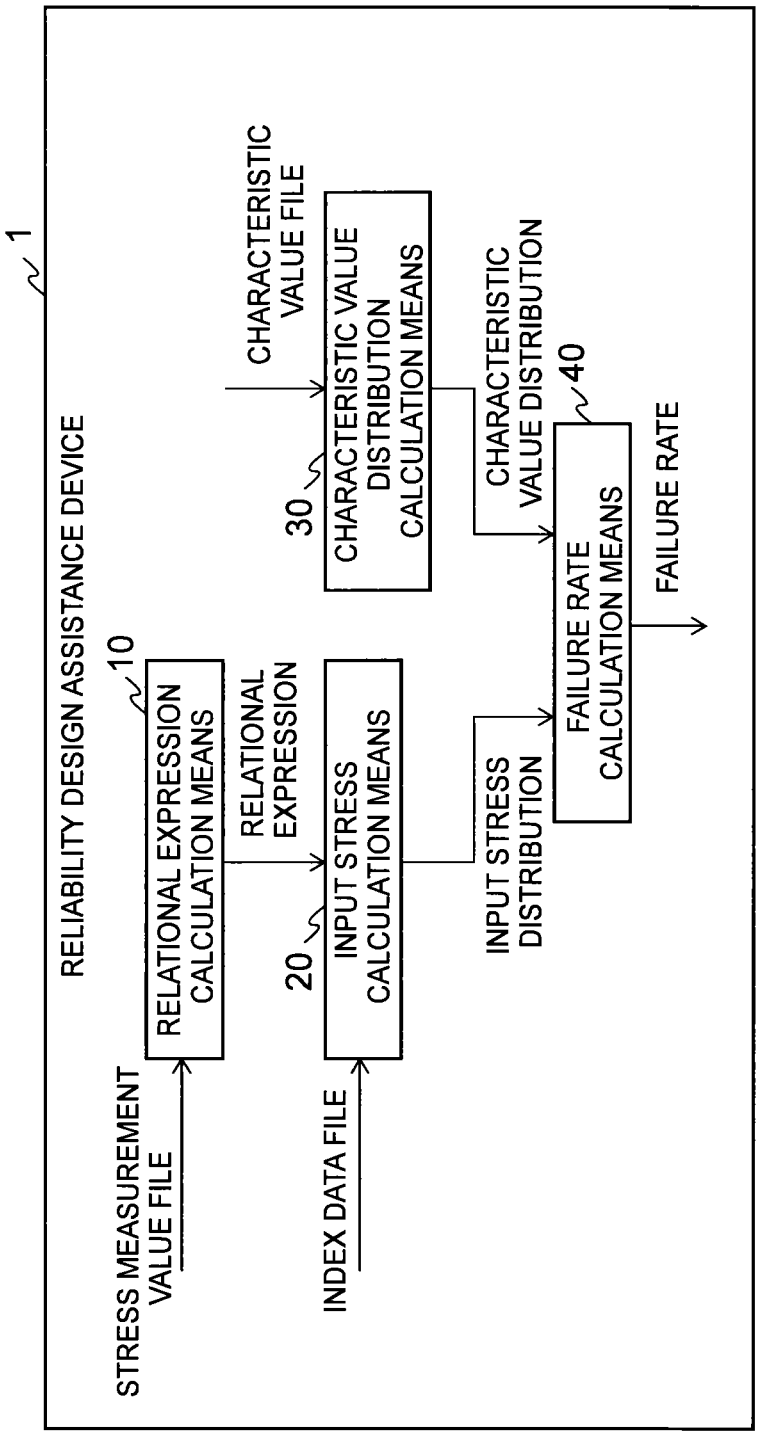
FIG. 1 is a block diagram showing a configuration of a reliability design assistance device 1 in a first embodiment.

Embodiments of the present invention are described below with reference to the drawings. FIG. 1 is a block diagram showing a configuration of a reliability design assistance device in this embodiment. A reliability design assistance device 1 is a device that performs the processes ((1) to (4) described above) of risk assessment carried out at a product development time described above. The following primarily describes the configuration and the operation about "(2-1) estimation of a failure rate", one of the processes described above.

The device (subject device), to which the reliability design assistance device 1 provides design assistance, may be any product. For example, the subject device is an electric assist bicycle, small-sized transportation mobility, and wearable robot, all of which closely contact a human body. These subject devices, primarily a device that contacts a human body, are a device in which a factor that varies according to the user (for example, weight) and a factor of the environment (for example, the condition of the road surface on which the subject device is used) are dominant factors of (have a very great effect on) the input stress. For example, when the user's weight is increased or decreased, the stress placed on the product varies widely.

The reliability design assistance device 1 includes relational expression calculation means 10, input stress calculation means 20, characteristic value distribution calculation means 30, and failure rate calculation means 40. The means are described below in detail.

The relational expression calculation means 10 reads a stress measurement value file. The stress measurement value file is a file that describes data strings each of which associates the value of a factor (also called a subject factor in the description below) with a stress measurement value corresponding to the value of the subject factor. The subject factor mentioned here refers to a factor that may vary according to the user or the environment, and the stress measurement value refers to a value measured when the subject device is used. For example, the stress measurement file describes a data string that associates the weight of each user with the stress measurement value measured when the user uses the subject device. In addition to the weight, the subject factors described in the stress measurement file include the physical features such as the height and the shoe size and the ratio between the height and the height of the steering wheel of small-sized transportation mobility.

The relational expression calculation means 10 calculates a relational expression indicating the relation between the value of a subject factor and the amount of stress by analyzing the data strings in the stress measurement value file using a general approximation method. For example, the relational expression calculation means 10 uses the response surface method as the approximation method to calculate a relational expression. The relational expression calculation means 10 may also use another method, such as a multiple regression analysis, as the approximation method. The relational expression calculation means 10 supplies the calculated relational expression to the input stress calculation means 20.

The input stress calculation means 20 reads an index data file that describes index data on a subject factor. For example, the index data file describes the probability density distribution of a subject factor. In this case, the index data file describes graph information (or information similar to this information) with the horizontal axis indicating the weight and the vertical axis indicating the distribution ratio. It is desirable that the index data file use reliable known data such as human body statistical data. The input stress calculation means 20 calculates the input stress distribution based on the relational expression, calculated by the relational expression calculation means 10, and the index data file.

In addition to the probability density distribution described above, the index data file may describe actually measured statistical data and logically calculated worst values. For example, as the actually measured statistical data, the distribution of data on the positions of both legs of users, who use small-sized transportation mobility, may be used. The logically calculated worst values are, for example, the maximum torque and maximum speed of a motor determined by the design of a subject device and the chemical substance density (value standardized by the standard of IEC (International Electrotechnical Commission)) of the use environment.

The input stress distribution, calculated by the input stress calculation means 20, is information represented by the amount of stress on the horizontal axis and the generation frequency on the vertical axis. The input stress calculation means 20 calculates the input stress distribution by performing analysis using the Monte Carlo method for the relational expression, calculated by the relational expression calculation means 10, and the index data file. The input stress calculation means 20 supplies the calculated input stress distribution to the failure rate calculation means 40. The input stress, calculated by the input stress calculation means 20, is not necessarily be a form of distribution but may be a linear expression such as the one shown in FIG. 3 that will be described later.

The characteristic value distribution calculation means 30 reads a characteristic value file. The characteristic value file is a file that describes the characteristic values such as the intensities of the parts used in a subject device. The characteristic value file describes the measurement values collected by sampling a plurality of parts of the subject device and measuring the amount of stress of the parts. The stress is measured, for example, by a general tension test. The characteristic value distribution calculation means 30 calculates a characteristic value distribution from the characteristic value file, with the stress on the horizontal axis and the generation frequency on the vertical axis. The characteristic value distribution calculation means 30 supplies the calculated characteristic value distribution to the failure rate calculation means 40.

In the above description, though the means (relational expression calculation means 10, input stress calculation means 20, characteristic value distribution calculation means 30) read information in the file format, the embodiment is not limited to this type of information. For example, data stored in a database may also be read.

In the above description, though the characteristic value distribution calculation means 30 calculates the characteristic value distribution of a subject device from the characteristic value file, the embodiment is not limited to this configuration. For example, another configuration is also possible in which an input file, which describes the characteristic value distribution, is input directly to the reliability design assistance device 1.

The failure rate calculation means 40 calculates the failure rate of a subject device according to an overlap between the input stress distribution and the characteristic value distribution. The detail of the method for calculating a failure rate will be described later with reference to FIG. 2. The failure rate calculation means 40 outputs the calculated failure rate to arbitrary output means (for example, display device) or a storage device (for example, file system).

Figure 2:
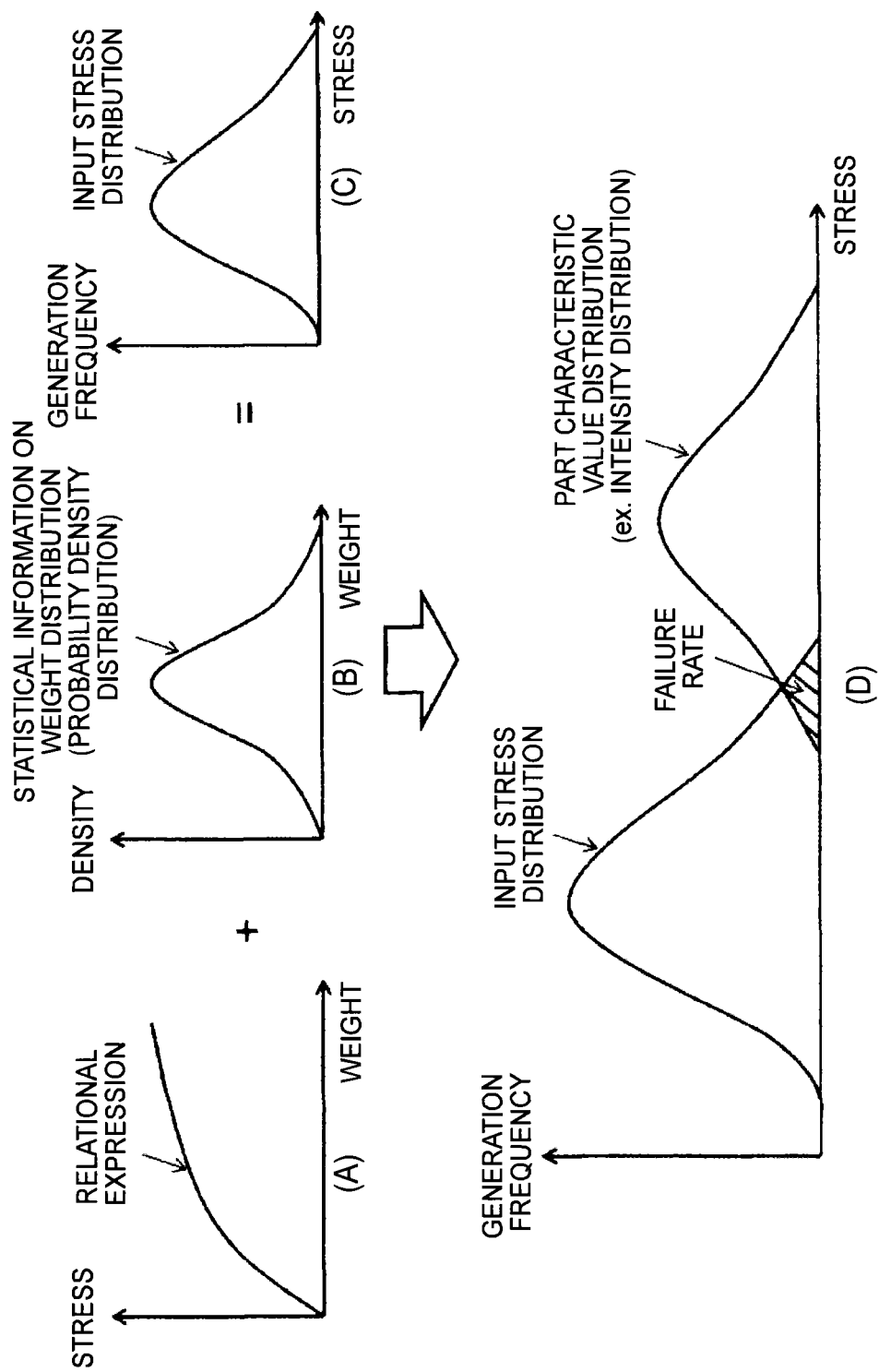
FIG. 2 a conceptual diagram showing an operation of the reliability design assistance device 1 in the first embodiment.

Next, a first operation example of the reliability design assistance device 1 is described with reference to FIG. 2. FIG. 2 is a conceptual diagram showing the first operation example of the reliability design assistance device 1. In the description below, the subject factor is assumed the weight of a user. The weight of a user is a factor that depends on the user.

The relational expression calculation means 10 reads all data strings stored in the stress measurement value file. Each of the data strings describes the association between the user, whose weight is X kg, with the stress measurement value indicating the stress applied when the user, whose weight is X kg, uses the subject device. The relational expression calculation means 10 calculates the relational expression (FIG. 2(A)) by analyzing all data strings in the stress measurement value file using an approximation method such as the response surface method.

The input stress calculation means 20 reads the index data file that indicates the statistical information on the weight distribution such as the one shown in FIG. 2(B). This index data file may be a file described as necessary according to the use of the subject device. For example, if the subject device is used only by Japanese people, not the probability density distribution of the weight of all mankind, but the probability density distribution of the weight of Japanese people only, may be used.

The input stress calculation means 20 calculates the input stress distribution (FIG. 2(C)) by performing a known analysis (for example, analysis through the Monte Carlo method) that uses the relational expression (FIG. 2(A)) and the statistical information on the weight distribution (FIG. 2(B)). The input stress distribution is a distribution indicating the relation between the amount of stress and the generation frequency as described above.

The characteristic value distribution calculation means 30 calculates the characteristic value distribution (for example, intensity distribution) of the parts by performing the intensity analysis of the parts used in the subject product (FIG. 2(D)). The characteristic distribution of the parts refers to the distribution indicating the relation between the amount of stress and the generation frequency of failures as shown in FIG. 2(D).

The failure rate calculation means 40 calculates the failure rate by comparing the input stress distribution (FIG. 2(C), FIG. 2(D)) and the characteristic value distribution (FIG. 2(D)). More specifically, the failure rate calculation means 40 calculates the ratio between the overlapping part between both distributions and the whole of the characteristic value distribution of the parts as the failure rate. That is, the failure rate calculation means 40 calculates the failure rate with the total number of parts as the denominator and the number of parts in the overlapping part as the numerator.

Figure 3:
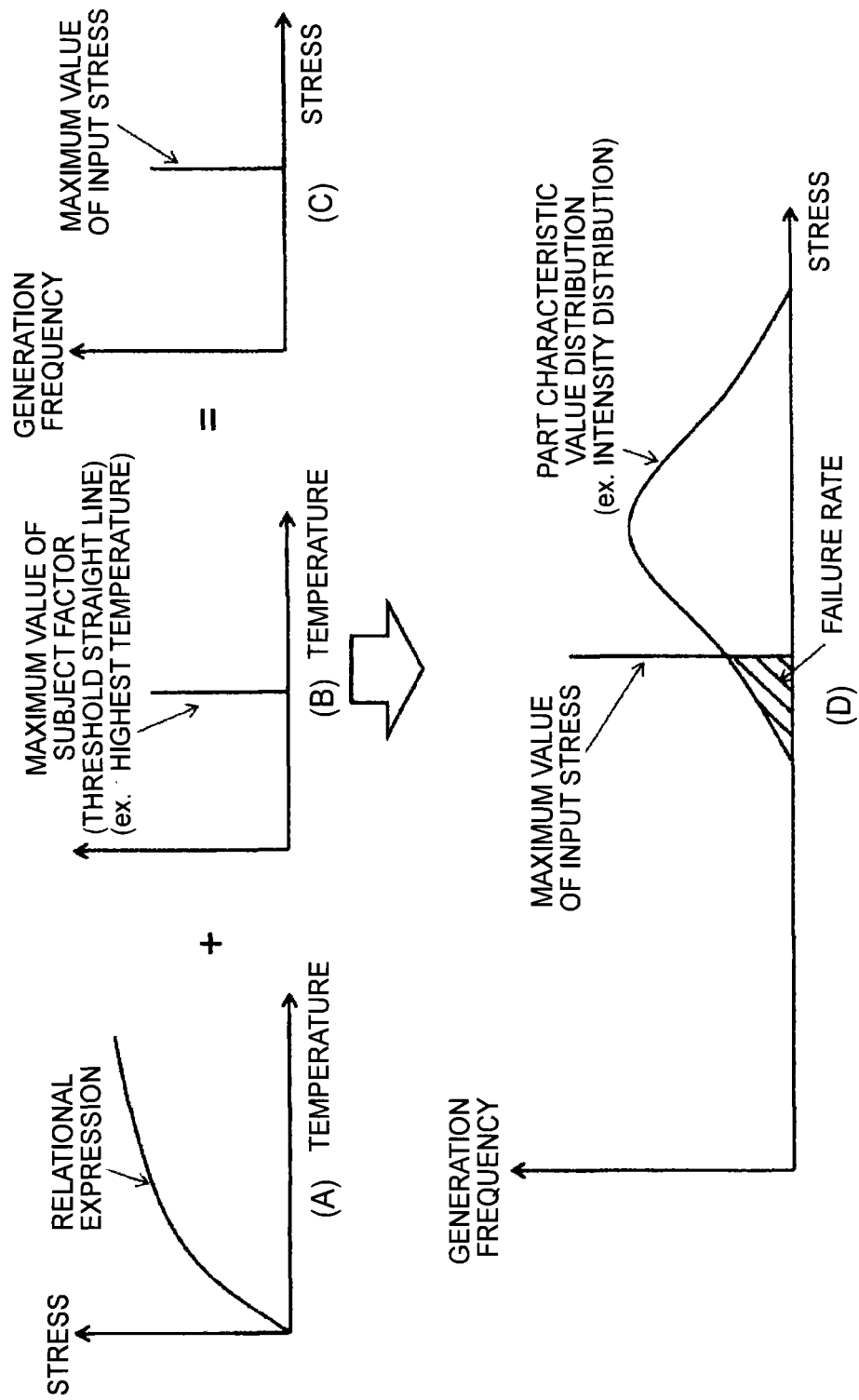
FIG. 3 a conceptual diagram showing an operation of the reliability design assistance device 1 in the first embodiment.

Next, a second operation example of the reliability design assistance device 1 is described below with reference to FIG. 3. FIG. 3 is a conceptual diagram showing the second operation example of the reliability design assistance device 1. In the description below, the subject factor is the temperature of the user's living environment in which the subject device is used. The temperature of the living environment is also a factor that varies according to the user's usage state.

The relational expression calculation means 10 reads all data strings stored in the stress measurement value file. Each of the data strings describes, for example, an association between a temperature and the stress measurement value when the subject device is used at the temperature. The relational expression calculation means 10 calculates the relational expression (FIG. 3(A)) by analyzing all data strings in the stress measurement value file using an approximation method such as the response surface method.

The input stress calculation means 20 reads the index data file. For example, the index data file describes a plurality of pieces of temperature data measured in a place where the subject device is used. The input stress calculation means 20 extracts the maximum value (highest temperature indicating the worst value) from the temperature data (FIG. 3(B)). The input stress calculation means 20 calculates the threshold straight line (FIG. 3(C)), which indicates the maximum value of the input stress, by substituting the extracted maximum value in the relational expression (FIG. 3(A)).

The failure rate calculation means 40 calculates the failure rate by comparing the threshold straight line (FIG. 3(C), FIG. 3(D)), which indicates the maximum value of the input stress, and the characteristic value distribution (FIG. 3(D)). The failure rate calculation means 40 calculates the failure rate based on the range in which the stress is smaller than the threshold straight line as shown in the figure.

Figure 4:
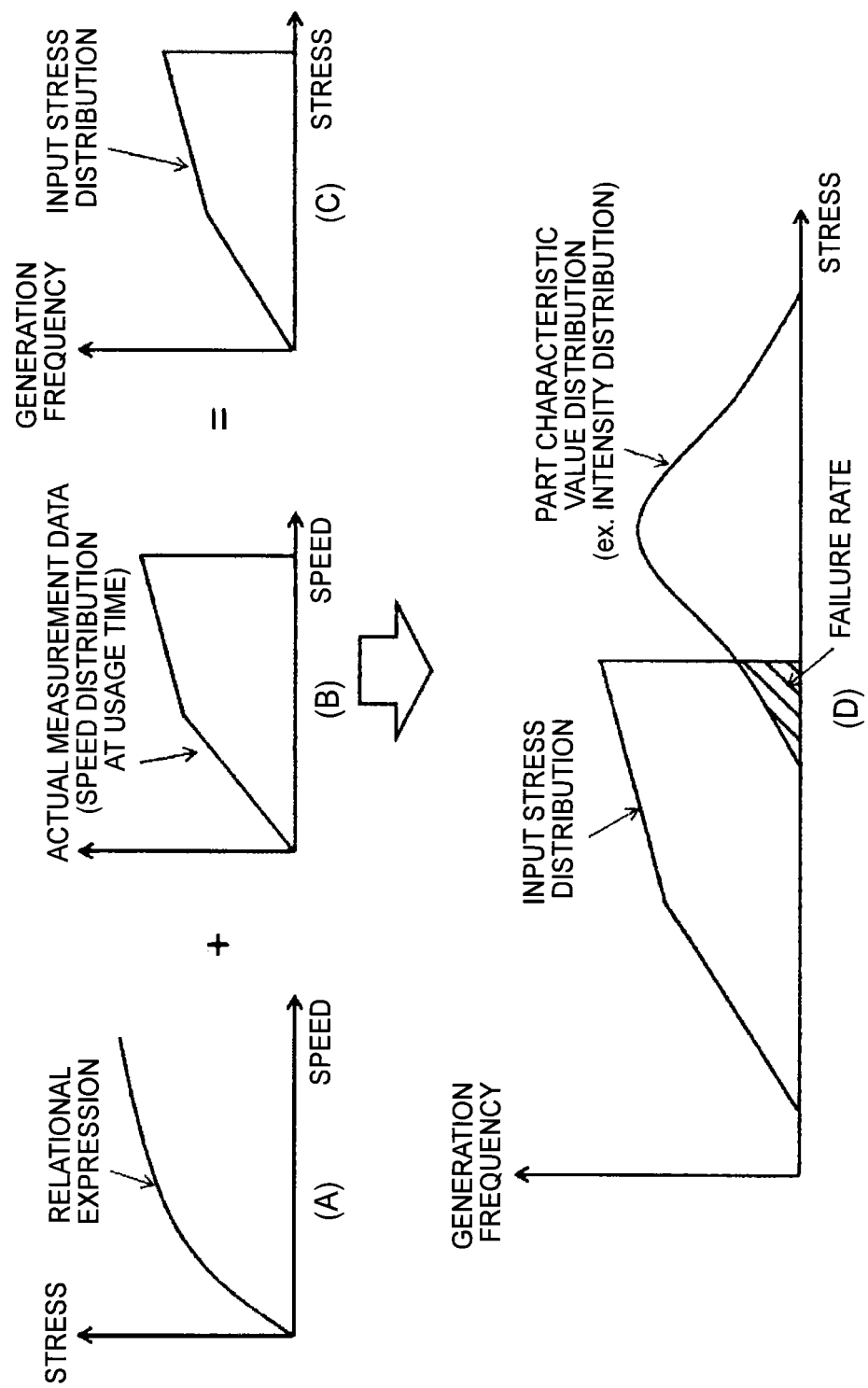
FIG. 4 a conceptual diagram showing an operation of the reliability design assistance device 1 in the first embodiment.

Next, a third operation example of the reliability design assistance device 1 is described below with reference to FIG. 4. FIG. 4 is a conceptual diagram showing the third operation example of the reliability design assistance device 1. In the description below, the subject device is small-sized transportation mobility. In addition, the subject factor is the speed distribution when the subject device is used. Because this operation example differs from the first operation example, described with reference to FIG. 2, only in the index data file, the contents of the index data file are described below.

The index data file describes the speed distribution the upper limit value (maximum speed) of which is limited by the internal control of the subject device as shown in FIG. 4(B). The input stress calculation means 20 calculates the input stress distribution (FIG. 4(C)) by performing a known analysis (for example, analysis through Monte Carlo method) using the relational expression (FIG. 4(A)) and the speed distribution (FIG. 4(B)).

Figure 5:
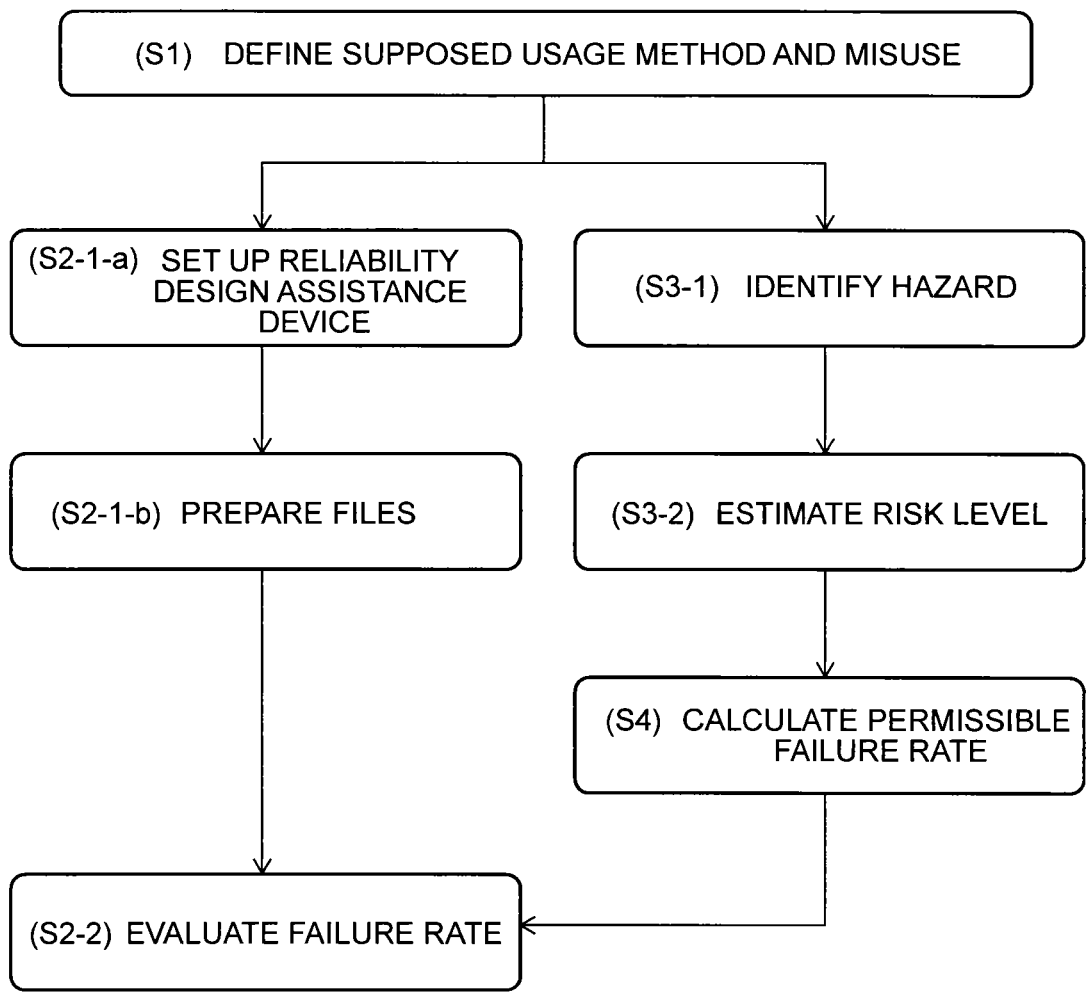
FIG. 5 a flowchart showing a risk assessment method using the reliability design assistance device 1 in the first embodiment.

Next, one method of risk assessment by means of the reliability design assistance device 1 is described below with reference to FIG. 5. First, the designer imagines a user of the subject device for which risk assessment is to be performed (or something that may contact the subject device) (S1). After that, the designer defines the usage method, which will be used by the imaged user (or something that may contact the subject device), and a predictable misuse (S1).

Next, the designer identifies a hazard that will be generated due to a behavior caused by the use or misuse of the subject device (S3-1). After that, the designer estimates the level of a risk based on the effect that the hazard will give to the user (S3-2). Next, the designer defines the permissible generation frequency of the risk, that is, the permissible failure rate, based on the estimated level of the risk and the number of subject devices to be shipped (S4). For example, the designer defines the permissible failure rate so that the failure rate becomes equal to the probability that none of all subject devices to be shipped will not give a great effect to the user.

In parallel with steps S3-1 to S4, the designer sets up the reliability design assistance device 1 described above (S2-1-*a*). The designer prepares various files (index data file, stress measurement value file, and characteristic value file) to be input to the reliability design assistance device 1.

The reliability design assistance device 1 calculates the failure rate using the method described above and compares the calculated failure rate and the permissible failure rate. The designer adjusts the design of the subject device as necessary until the calculated failure rate becomes smaller than the permissible failure rate. The reliability design assistance device 1 for handling the permissible failure rate is required only to have failure rate evaluation means (not shown) provided in the subsequent stage of the failure rate calculation means 40 as a component added to the the configuration shown in FIG. 1. The failure rate evaluation means compares the failure rate, calculated by the failure rate calculation means 40 and the permissible failure rate entered by the designer.

Figure 6:
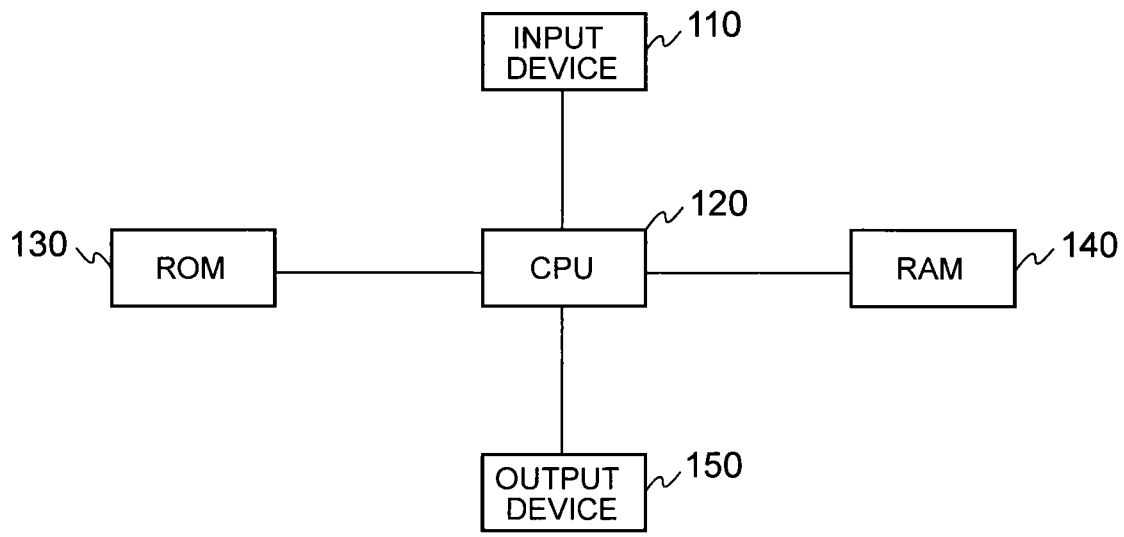
FIG. 6 a block diagram showing a hardware configuration of the reliability design assistance device 1 in in the first embodiment.

Next, the hardware configuration of the reliability design assistance device 1 is described below with reference to FIG. 6. The reliability design assistance device 1 includes an input device 110, a CPU (Central Processing Unit) 120, a ROM (Read Only Memory) 130, a RAM (Random Access Memory) 140, and an output device 150 as the hardware. The configuration shown in FIG. 6 is exemplary only, and another configuration may also be used. Storage devices such as a USB (Universal Serial Bus) memory may be removably configured.

The input device 110 is an information input device such as a keyboard and a mouse. The ROM 130 is a storage device used for storing BIOS (Basic Input/Output System) and IPL (Initial Program Loader). The RAM 140 is a memory used as the working area of the CPU 120 where programs are stored and programs are executed. The CPU 120 reads and executes a program and controls an output to the output device 150. The output device 150 is a device that outputs operation-processing results under control of the CPU 120. The output device 150 is a device such as a liquid crystal display device and a printer.

Next, the effect of the reliability design assistance device 1 in this embodiment is described. The reliability design assistance device 1 calculates an input stress (for example, FIG. 2(C), FIG. 3(C)) based on the probability distribution, or the maximum value or minimum value, of a subject factor that varies according to the user or the usage environment of the subject device as described above. After that, the reliability design assistance device 1 calculates the failure rate of the subject device using this input stress. That is, the reliability design assistance device 1 calculates the input stress considering a change in the value of the factor. Therefore, even when a varying factor that varies according to the user or the environment is a dominant factor of the input stress, the reliability design assistance device 1 can calculate a correct failure rate. In particular, even when a human body support device (for example, electric assist bicycle, small-sized transportation mobility, and wearable robot), in which physical features such as the weight or height have a great effect on the input stress, is the subject device, the reliability design assistance device 1 can correctly calculate the failure rate. This ability allows the designer to design a highly reliable, low-cost subject device.

The reliability design assistance device 1 can calculate a failure rate considering the user's physical features (weight, height) as the subject factor as shown in FIG. 2. In this case, the reliability design assistance device 1 can calculate an input stress distribution based on a statistical probability density distribution where the population parameter is large, that is, a reliable distribution. Therefore, the reliability design assistance device 1 can calculate a reliable input stress distribution. Therefore, the reliability design assistance device 1 can accurately calculate the failure rate.

The reliability design assistance device 1 can also calculate a failure rate based on the maximum value (worst value) of a subject factor as shown in FIG. 3. This allows the reliability design assistance device 1 to calculate a failure rate considering the case in which the subject device is used in the worst environment (for example, when the subject device is used at the highest temperature). Evaluating this failure rate leads to the design of a safer product. Although the maximum value of a subject factor is used in the above description, the embodiment is not limited to the maximum value. For example, a failure rate may also be calculated considering the minimum value according to the nature of a factor.

Second Embodiment

A reliability design assistance device 1 in this embodiment is characterized in that a failure rate is calculated considering the shape characteristics of the parts used in a subject device. The difference between the reliability design assistance device 1 in this embodiment and that in the first embodiment is described below. In the description below, the same name and the reference numeral are used to denote the same processing unit as that in the first embodiments, and the further description of that unit will be omitted.

Figure 7:
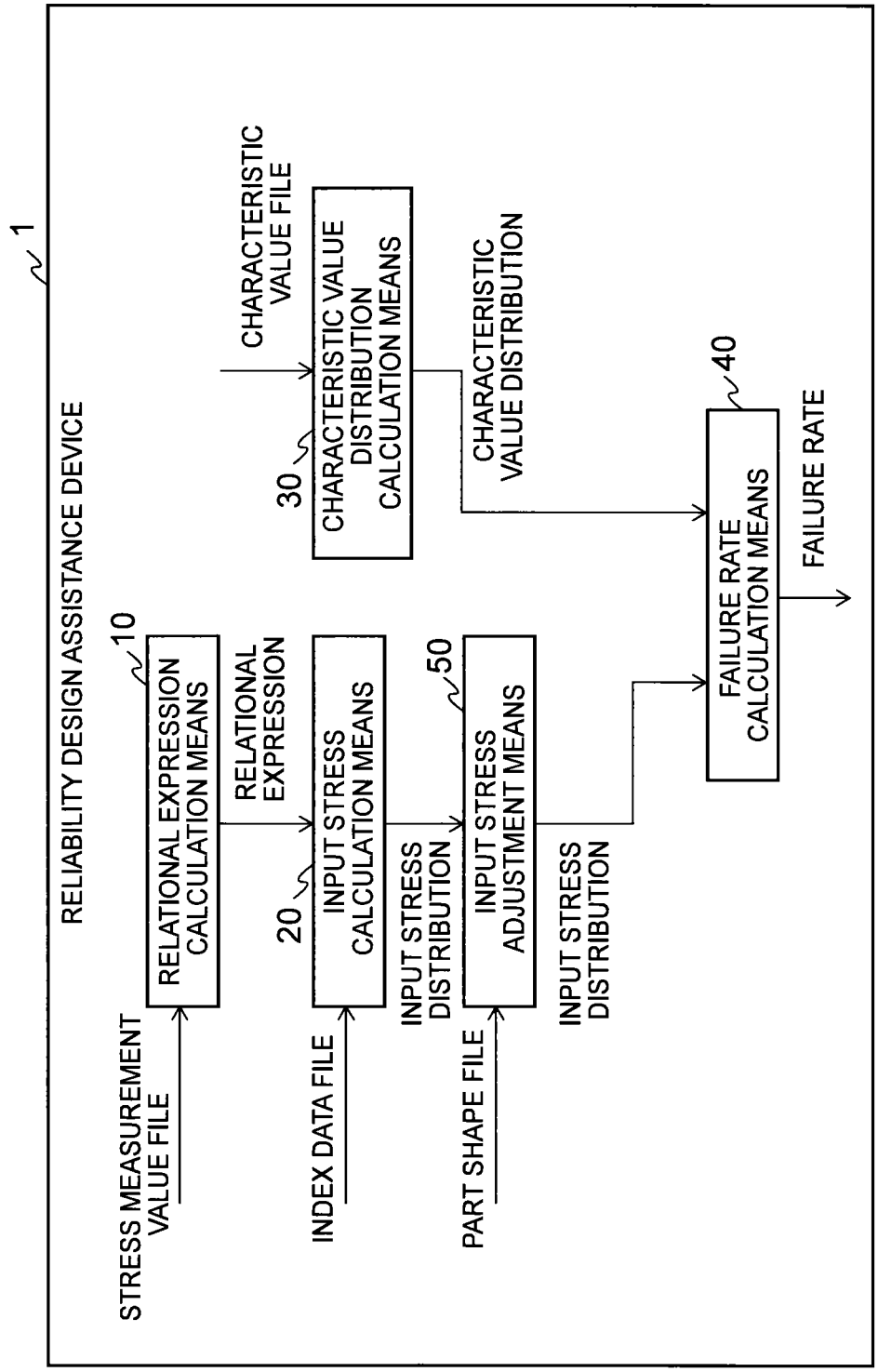
FIG. 7 is a block diagram showing a configuration of a reliability design assistance device 1 in a second embodiment.

FIG. 7 is a block diagram showing a configuration of the reliability design assistance device 1 in this embodiment. The reliability design assistance device 1 in this embodiment has the configuration shown in FIG. 1 and further includes input stress distribution adjustment means 50.

The input stress calculation means 20 calculates a stress distribution using the method described above. In this case, the input stress calculation means 20 calculates the input stress distribution with the stress, expressed in Newtons, on the horizontal axis and the generation frequency on the vertical axis, and supplies the calculated input stress distribution to the input stress adjustment means 50.

The input stress adjustment means 50 receives the input stress distribution described above and the part shape file. The part shape file is a file in which data indicating the shapes of the parts of a subject device is stored. The part shape file stores data (part shape data) in the format that can be used for the finite element analysis that will be described later.

The input stress adjustment means 50 performs the finite element analysis, based on the part shape file and the input stress distribution, for calculating the adjusted input stress distribution. This input stress distribution is a distribution with the stress, calculated in megapascals (Mpa), on the horizontal axis and the generation frequency on the vertical axis. The input stress adjustment means 50 supplies the input stress distribution (stress distribution with the stress in megapascals (Mpa) on the horizontal axis), which has been adjusted using the part shape file, to the failure rate calculation means 40. The failure rate calculation means 40 is required only to calculate the failure rate using the same method as that in the first embodiment.

Next, the effect of the reliability design assistance device 1 in this embodiment is described below. In this embodiment, an input stress distribution, in which the shapes of the parts used in the subject device are taken into consideration, is calculated as described above. This allows the reliability design assistance device 1 in this embodiment to calculate the failure rate more accurately.

Each of the means (relational expression calculation means 10, input stress calculation means 20, characteristic value distribution calculation means 30, failure rate calculation means 40, and input stress adjustment means 50) of the reliability design assistance device 1 in the first embodiment and the second embodiment described above is executed by the CPU 120 as a program. The program can be stored in various types of non-transitory computer readable media for supply to the computer. The non-transitory computer readable media include various types of tangible storage media. Examples of a non-transitory computer readable medium include a magnetic recording medium (for example, flexible disk, magnetic tape, hard disk drive), a magneto-optical recording medium (for example, magneto-optical disk), a CD-ROM (Read Only Memory), a CD-R, a CD-R/W, and a semiconductor memory (for example, mask ROM, PROM (Programmable ROM), EPROM (Erasable PROM), flash ROM, and RAM (random access memory)). The program may also be supplied to the computer via various types of transitory computer readable media. Examples of a transitory computer readable medium include an electric signal, an optical signal, and an electromagnetic wave. A transitory computer readable medium can supply the program to the computer via a wired communication line, such as an electric wire and an optical fiber, or a wireless communication line.

While the present invention has been described according to the embodiments described above, it is to be understood that the present invention is not limited to the configuration of the above embodiments but includes various modifications, changes, and combinations that may be made by those skilled in the art within the scope of the invention according to the claims of the present application.

This application claims priority to Japanese Patent Application Publication No. 2013-031747 (JP 2013-031747 A) filed on Feb. 21, 2013, the contents of which are incorporated in its entirety herein by reference.

DESCRIPTION OF THE REFERENCE NUMERALS

1 Reliability design assistance device
10 Relational expression calculation means 20 Input stress calculation means
30 Characteristic value distribution calculation means
40 Failure rate calculation means
50 Input stress adjustment means
110 Input device
120 CPU
130 ROM
140 RAM
150 Output device

The invention claimed is:

1. A reliability design assistance device comprising:
relational expression calculation means for calculating a relational expression by performing approximation calculation for data strings each of which associates a value of a subject factor being a physical characteristic of a user including a weight X of the user with an input stress measurement value indicating an input stress applied to a subject device when the user having the weight X uses the subject device;
input stress calculation means for calculating a stress distribution based on the relational expression and a probability density distribution of the physical characteristic of the user;
characteristic value distribution means for calculating a characteristic value distribution of the subject device from collected measurement stress values of a plurality of parts of the subject device; and
failure rate calculation means for calculating a failure rate of the subject device based on an overlap between the stress distribution and the characteristic value distribution of the subject device,
wherein the subject device is an electric assist bicycle, a personal-sized transportation mobility device, or a wearable robot.

2. The reliability design assistance device according to claim 1, wherein
the input stress calculation means calculates the stress distribution as a threshold straight line by substituting a worst value of the subject factor in the relational expression, and
the failure rate calculation means calculates the failure rate of the subject device from a distribution area formed by the characteristic value distribution and the threshold straight line.

3. The reliability design assistance device according to claim 2, wherein the failure rate calculation means calculates the failure rate based on a range in which stress values on the stress distribution are smaller than the threshold straight line.

4. The reliability design assistance device according to claim 1, further comprising:
input stress distribution adjustment means for
receiving the stress distribution calculated by the input stress calculation means,
receiving shape data indicating shapes of the plurality of parts of the subject device, and
adjusting calculated the stress distribution by performing a finite element analysis using the shape data.

5. The reliability design assistance device according to claim 1, wherein the failure rate calculation means calculates the failure rate as a ratio of the overlap with respect to the whole of the characteristic value distribution.

6. A reliability design assistance method comprising:
calculating a relational expression by performing approximation calculation for data strings each of which associates a value of a subject factor being a physical characteristic of a user including a weight X of the user with an input stress measurement value indicating an input stress applied to a subject device when the user having the weight X uses the subject device;
calculating a stress distribution based on the relational expression and a probability density distribution of the physical characteristic of the user,
calculating a characteristic value distribution of the subject device from collected measurement stress values of a plurality of parts of the subject device; and
calculating a failure rate of the subject device based on an overlap between the stress distribution and the characteristic value distribution of the subject device,
wherein the subject device is an electric assist bicycle, a personal-sized transportation mobility device, or a wearable robot.

7. A reliability design assistance device comprising:
at least one electronic control unit configured to:
calculate a relational expression by performing approximation calculation for data strings each of which associates a value of a subject factor being a physical characteristic of a user including a weight X of the user with an input stress measurement value indicating an input stress applied to a subject device when the user having the weight X uses the subject device;
calculate a stress distribution based on the relational expression and a probability density distribution of the physical characteristic of the user;
calculate a characteristic value distribution of the subject device from collected measurement stress values of a plurality of parts of the subject device; and
calculate a failure rate of the subject device based on an overlap between the stress distribution and the characteristic value distribution of the subject device,
wherein the subject device is an electric assist bicycle, a personal-sized transportation mobility device, or a wearable robot.

8. The reliability design assistance device according to claim 7, wherein
the electronic control unit is configured to calculate the stress distribution as a threshold straight line by substituting a worst value of the subject factor in the relational expression, and
the electronic control unit is configured to calculate the failure rate of the subject device from a distribution area formed by the characteristic value distribution and the threshold straight line.

9. The reliability design assistance device according to claim 8, wherein the electronic control unit is configured to calculate the failure rate based on a range in which stress values on the stress distribution are smaller than the threshold straight line.

10. The reliability design assistance device according to claim 7, wherein the electronic control unit is configured to:
receiving shape data indicating shapes of the plurality of parts of the subject device, and
adjust the calculated stress distribution by performing a finite element analysis using the shape data.

11. The reliability design assistance device according to claim 7, wherein the electronic control unit is configured to calculate the failure rate as a ratio of the overlap with respect to the whole of the characteristic value distribution.

* * * * *